US006668963B2

(12) United States Patent
Nada

(10) Patent No.: US 6,668,963 B2
(45) Date of Patent: Dec. 30, 2003

(54) VEHICLE WITH HIGH VOLTAGE POWER SOURCE MOUNTED THEREON, POWER SOURCE CONTROLLER, METHOD OF STARTING SUCH VEHICLE, AND METHOD OF UTILIZING HIGH VOLTAGE POWER SOURCE

(75) Inventor: Mitsuhiro Nada, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 283 days.

(21) Appl. No.: 09/843,928

(22) Filed: Apr. 30, 2001

(65) Prior Publication Data
US 2002/0017405 A1 Feb. 14, 2002

(30) Foreign Application Priority Data
May 9, 2000 (JP) ........................................ 2000-136130

(51) Int. Cl.7 .............................................. B60K 28/14
(52) U.S. Cl. ....................... 180/279; 180/65.2; 307/10.1
(58) Field of Search ................................. 180/65.2, 279, 180/283, 65.8, 65.1; 318/430; 307/10.1

(56) References Cited

U.S. PATENT DOCUMENTS

| 5,133,426 A | * | 7/1992 | Niriella et al. ............. 180/287 |
| 5,327,990 A | * | 7/1994 | Busquets ..................... 180/271 |
| 5,442,243 A | * | 8/1995 | Bailey ......................... 408/30 |
| 5,565,711 A |   | 10/1996 | Hagiwara |
| 5,794,732 A |   | 8/1998 | Lorenz et al. |
| 5,816,358 A | * | 10/1998 | Adler et al. ................. 180/279 |
| 5,818,121 A | * | 10/1998 | Krappel et al. ............. 307/10.7 |
| 5,877,601 A |   | 3/1999 | Obara et al. |
| 5,971,801 A | * | 10/1999 | Kato et al. .................. 439/511 |
| 6,053,762 A | * | 4/2000 | Matsumura et al. ........ 439/484 |
| 6,161,640 A | * | 12/2000 | Yamaguchi ................. 180/65.8 |

FOREIGN PATENT DOCUMENTS

| EP | 0 633 158 A1 | 6/1994 |
| JP | A 4-208007 | 7/1992 |
| JP | A 6-98403 | 4/1994 |

* cited by examiner

Primary Examiner—Brian L. Johnson
Assistant Examiner—J. Allen Shriver
(74) Attorney, Agent, or Firm—Oliff & Berridge, PLC

(57) ABSTRACT

A vehicle with a high voltage power source mounted thereon has a diversity of protection mechanisms to protect the driver and mechanics from potential accidents. Even in the case of a subtle erroneous operation or detection, one of such mechanisms cuts off the supply of the high voltage power source. This undesirably lowers the convenience of use. The arrangement of the present invention carries out evaluation and determines that the driver intends to start the vehicle in a normal manner, when the time on a first timer Toff is greater than a preset minimum off time Tmin, for example, 5 seconds but less than a preset maximum off time Tmax, for example, 1 hour. Based on this evaluation, system main relays SMR are set on to permit a start of the vehicle. In the case where an ignition key of the vehicle is operated normally twice at a time interval of several seconds, even if an interlock reed switch IRL is in the off state, the arrangement tries to start the vehicle since there is a possibility that a grip SG of a service plug SP is mistakenly pulled out. When the service plug SP is actually taken out under such conditions, even the on state of the system main relays SMR does not allow the high voltage of an HV battery to be applied to the high voltage power line of the vehicle.

6 Claims, 6 Drawing Sheets

VEHICLE WITH HIGH VOLTAGE POWER SOURCE MOUNTED THEREON, POWER SOURCE CONTROLLER, METHOD OF STARTING SUCH VEHICLE, AND METHOD OF UTILIZING HIGH VOLTAGE POWER SOURCE

BACKGROUND OF THE INVENTION

1. Field of the Invention

The present invention relates to a vehicle with a high voltage power source mounted thereon, a power source controller for controlling the high voltage power source, a method of starting such a vehicle with the high voltage power source mounted thereon, and a method of utilizing the high voltage power source. More specifically the invention pertains to a technique of handling a power source with a cutoff member that cuts off the output of the high voltage power source in a manual manner on the side closer to the power source.

2. Description of the Related Art

A diversity of apparatuses, such as electric vehicles, with the high voltage power source mounted thereon and special vehicles that carry out various works with the high voltage electric power of the high voltage power source mounted thereon have been used in various fields. A variety of safety devices are installed in such apparatuses and vehicles to ensure the safety of use of the high voltage power source. One of such safety devices is a cutoff member that is handled in a manual manner to cut off the output of the high voltage power source on the side closer to the power source. In electric vehicles and hybrid vehicles that utilize electricity as one of the energy sources, a cutoff member called a service plug is provided to prevent the mechanic, who carries out the maintenance, from unintentionally coming into contact with the high voltage system. The service plug is removed during the work of maintenance. One proposed safety device, which is disclosed in JAPANESE PATENT LAID-OPEN GAZETTE No. 6-98403, independently detects the state of voltage application to the high voltage power source system and the state of charge in the battery, keeps a protection cover over the high voltage system fixed according to the requirements, and permits voltage application to the high voltage system and charging the battery only when the protection cover is kept fixed.

Especially in the vehicles with the high voltage power source, it is required to prohibit the output of the high voltage power source to the high voltage system in the case of dismantling the vehicle or its parts or in the case of cutting the vehicle, for example, after a traffic accident. This keeps the mechanics or rescue corps from the accidental contact with the high voltage system. For such purposes, a variety of safety devices have been proposed. The most effective measure is, however, still a manual operation of the cutoff member like the service plug. In some prior art vehicles with the manually handled cutoff member like the service plug, there is a mechanism of detecting the open state of a protection cover that allows the cutoff member to be attached or detached. One example of such mechanism is an interlock mechanism, which assumes that the driver or the mechanic intends to carry out inspection and maintenance of the vehicle or the apparatus while the protection cover is in the open state and opens the contact of a relay provided in the high voltage system (that is, cuts off the high voltage power source).

Application of the interlock mechanism, however, causes another problem that the start of the vehicle or the apparatus is not allowed even in the case where the driver or the mechanic simply forgets to shut the protection cover. The safety and the convenience naturally conflict with each other. In any systems, the enhanced safety leads to the restricted convenience. If the driver or the mechanic forgets to shut the protection cover, the driver can not start the vehicle. In such cases, it is highly probable that the vehicle has undergone some maintenance. The driver may thus suspect that there should be some failure in maintenance of the vehicle. The protection cover over the service plug is not observable unless the hood of the vehicle is open. This also makes it difficult to find such a simple cause of the failed start as forgetting to shut the protection cover.

SUMMARY OF THE INVENTION

The object of the present invention is thus to improve the convenience of use of a vehicle and an apparatus with a high voltage power source mounted thereon without reducing the degree of safety and especially to allow a start of the vehicle and the apparatus when the safety conditions are fulfilled.

At least part of the above and the other related objects is attained by a vehicle with a high voltage power source mounted thereon. The vehicle includes: a relay having a contact interposed between the high voltage power source and a power line of the vehicle; a relay actuation requirement unit that outputs a requirement signal to close the contact of the relay; a cutoff member that is handled in a manual manner to cut off output of the high voltage power source on a side closer to the power source than the relay; an operation detection unit that detects an operation including a specific operation to handle the cutoff member; a prohibition unit that prohibits the contact of the relay from being closed in response to detection of the specific operation to handle the cutoff member; a driving action detection unit that detects a driver's driving action; an evaluation unit that evaluates a result of the detection of the operation detection unit, based on a result of the detection by the driving action detection unit; and a cancellation unit that, when the evaluation unit specifies that the evaluated result of the detection of the operation detection unit is an operation other than the specific operation to handle the cutoff member, cancels the function of the prohibition unit, which prohibits the contact of the relay from being closed, but actuates the relay in response to the requirement signal output from the relay actuation requirement signal.

The technique of the present invention is also actualized by the corresponding method of starting such a vehicle with the high voltage power source mounted thereon. The present invention is accordingly directed to a method of starting a vehicle with a high voltage power source mounted thereon. The method includes the steps of: interposing a contact of a relay between the high voltage power source and a power line of the vehicle; detecting a preliminary operation to handle a cutoff member that cuts off output of the high voltage power source in a manual manner on a side closer to the power source than the relay; prohibiting the contact of the relay from being closed in response to detection of the preliminary operation to handle the cutoff member; detecting a driver's driving action; evaluating the detected preliminary operation, based on a result of the detection of the driving action; and when the evaluation specifies that the detected preliminary operation is other than a specific operation to handle the cutoff member, canceling the prohibition on the function of closing the contact of the relay in response to input of a requirement signal to close the contact of the relay, so as to allow a start of the vehicle.

The present invention is also directed to a power source controller disposed in an apparatus with a high voltage power source mounted thereon. The power source controller includes: a relay having a contact interposed between the high voltage power source and a power line of the apparatus; a cutoff member that is handled in a manual manner to cut off output of the high voltage power source on a side closer to the power source than the relay; an operation detection unit that detects an operation including a specific operation to handle the cutoff member; a prohibition unit that prohibits the contact of the relay from being closed in response to detection of the operation; an operational action detection unit that detects an operator's operational action of the apparatus; an evaluation unit that evaluates a result of the detection of the operation detection unit, based on a result of the detection by the operational action detection unit; and a cancellation unit that, when the evaluation unit specifies that the evaluated result of the detection of the operation detection unit is an operation other than the specific operation to handle the cutoff member, cancels the function of the prohibition unit, which prohibits the contact of the relay from being closed, in response to input of a requirement signal to close the contact of the relay.

The technique of the present invention is further actualized by the corresponding method of utilizing the high voltage power source mounted on the apparatus. The present invention is accordingly directed to a method of utilizing a high voltage power source mounted on an apparatus. The method includes the steps of: interposing a contact of a relay between the high voltage power source and a power line of the apparatus; detecting a preliminary operation to handle a cutoff member that cuts off output of the high voltage power source in a manual manner on a side closer to the power source than the relay; prohibiting the contact of the relay from being closed in response to detection of the preliminary operation to handle the cutoff member; detecting an operator's operational action of the apparatus; evaluating the detected preliminary operation, based on a result of the detection of the operational action; and when the evaluation specifies that the detected preliminary operation is other than a specific operation to handle the cutoff member, canceling the prohibition on the function of closing the contact of the relay in response to input of a requirement signal to close the contact of the relay, so as to allow a start of the apparatus.

Any of the above applications of the technique of the present invention detects an action performed by the driver of the vehicle or the operator of the apparatus and evaluates a detected operation, based on the detected action. When the evaluation shows that the detected operation is other than a specific operation to handle the cutoff member, regardless of the detected action, the arrangement cancels the prohibition on the function of closing the contact of the relay. This arrangement allows the contact of the relay to be closed and outputs the high voltage power source to the power line of the vehicle or the apparatus, in the case where the driver's action or the operator's action intends to close the contact of the relay. This enables the vehicle or the apparatus to start in response to a starting requirement.

In the vehicle of the present invention, the driver's action may be detected by a sensor that detects an instruction to drive the vehicle. In this structure, the evaluation may specify that the detected operation is other than the specific operation to handle the cutoff member, when the instruction to drive the vehicle is detected at least twice in a preset first time period. It is generally improbable that the consecutively output two or more instructions to drive the vehicle within the preset time period is just some error. In such cases, it is practical to regard the detected operation to handle the cutoff member is a wrong recognition This arrangement enhances the convenience of use of the vehicle or the apparatus, while assuring the sufficient safety of working.

In the above arrangement, the condition of the evaluation may be initialized when a second preset time period has elapsed since a first detection of the instruction to drive the vehicle. For example, when several tens minutes have elapsed between the first detection and the second detection, it is impractical to regard the two instructions as the consecutive, related instructions. The first time period and the second time period may be determined empirically, based on the results of actual operations of a large number of users and the studies on the expected behaviors of the human. It is probable that the driver simply forgets to shut the cover of the service plug and gives a starting instruction through an operation of the ignition key. Various data, for example, the time interval between consecutive key operations to start the vehicle and the elapse of time required for inspection of the vehicle between the first starting action and the second starting action, are statistically processed to determine these preset time periods.

In electric vehicles and hybrid vehicles, the high voltage power source may be a battery or fuel cells used to drive motors. The high voltage power source also includes high voltage batteries used in special vehicles that carry out various works with the high voltage electric power of the battery. The principle of the present invention is applicable to a diversity of apparatuses with a high voltage battery or a capacitor, as well as to the diversity of vehicles.

In any of the above applications of the present invention, when the operations including the specific operation to handle the cutoff member, one preferable arrangement informs the driver of the detection. Such information may be given in the form of visual alarm, for example, light flashing, or sound alarm. The alarm may be given when the operations including the specific operation to handle the cutoff member is detected or when the operations including the specific operation to handle the cutoff member is detected and a requirement to start the vehicle is received.

These and other objects, features, aspects, and advantages of the present invention will become more apparent from the following detailed description of the preferred embodiment with the accompanying drawings.

DESCRIPTION OF THE PREFERRED EMBODIMENTS

For the purpose of clarifying the configuration and the functions of the present invention, a hybrid vehicle in one embodiment of the present invention is discussed below in the following sequence:

A. General Structure of Hybrid Vehicle

B. Basic Operations in Hybrid Vehicle

Figure 1:
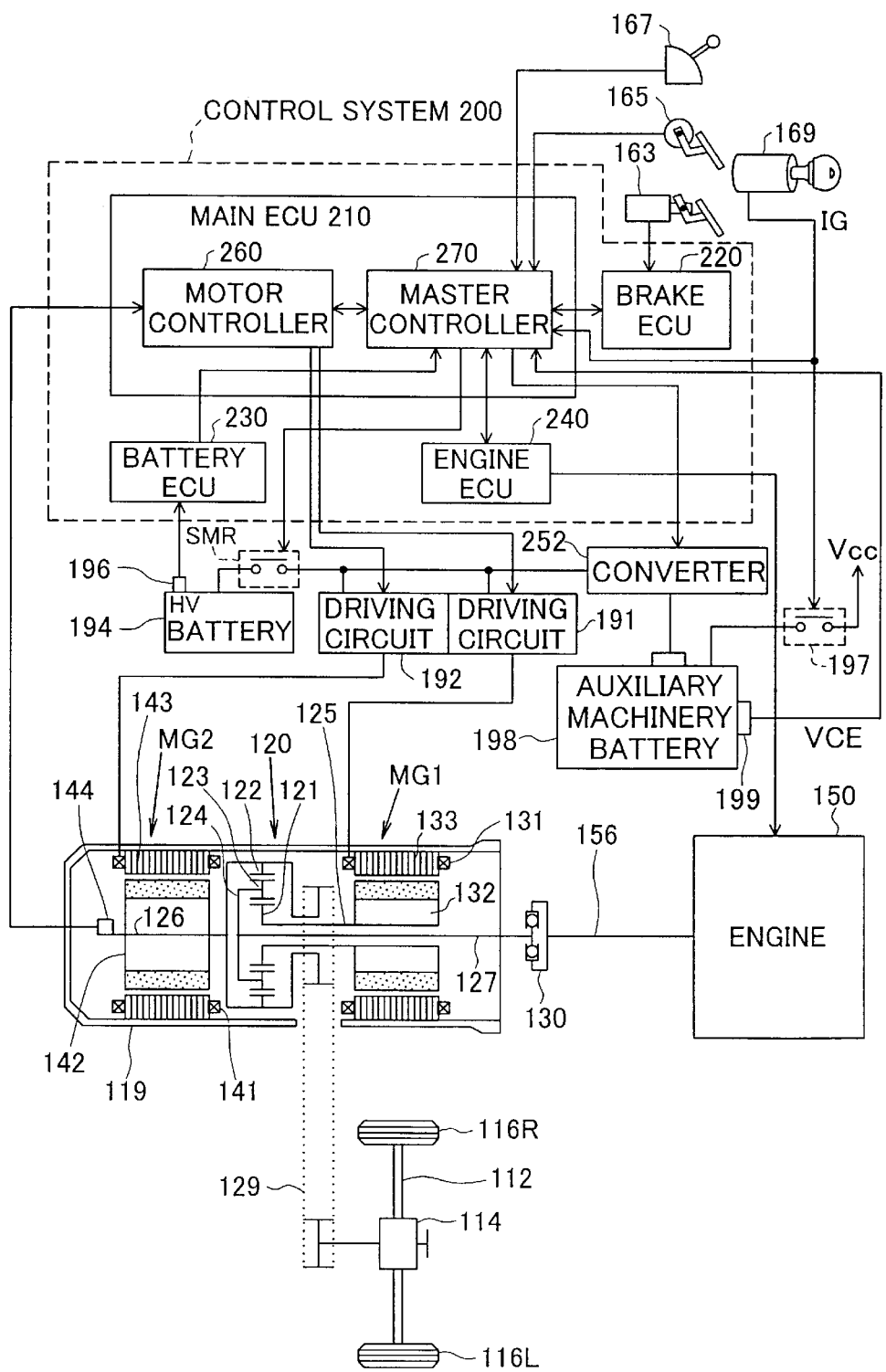
FIG. 1 schematically illustrates the general structure of a hybrid vehicle in one embodiment of the present invention.

C. Configuration of Control System in Embodiment
D. Control at Starting Time
A. General Structure of Hybrid Vehicle FIG. 1 schematically illustrates the general structure of a hybrid vehicle in one embodiment of the present invention. The hybrid vehicle has three prime movers, that is, one engine 150 and two motor generators MG1 and MG2. Here the motor generator represents the prime mover functioning as both a motor and a generator. In the description hereinafter, for simplicity of explanation, the motor generators are simply referred to as the motors. The hybrid vehicle is under the control of a control system 200.

The control system 200 includes a main ECU 210, a brake ECU 220, a battery ECU 230, and an engine ECU 240. Each of these ECUs is constructed as an integral unit, where a plurality of circuit elements including a microcomputer, an input interface, and an output interface are arranged on one identical circuit board. The main ECU 210 includes a motor controller 260 and a master controller 270. The master controller 270 functions to determine a variety of control-relating quantities, for example, distribution of the output from the three prime movers 150, MG1, and MG2.

The engine 150 is an ordinary gasoline engine that explosively combusts gasoline as fuel and rotates a crankshaft 156 with the combustion energy. The engine ECU 240 controls operations of the engine 150. The engine ECU 240 regulates the quantity of fuel injection into the engine 150 and other required quantities in response to instructions transmitted from the master controller 270.

The motors MG1 and MG2 are constructed as synchronous motors, and respectively include rotors 132 and 142 with a plurality of permanent magnets mounted on outer circumferences thereof, and stators 133 and 143 with three-phase coils 131 and 141 wound thereon to form revolving magnetic fields. The stators 133 and 142 are fixed to a casing 119. The three-phase coils 131 and 141 wound on the stators 133 and 143 of the motors MG1 and MG2 are respectively connected to a secondary battery or high voltage (HV) battery 194 via driving circuits 191 and 192. Each of the driving circuits 191 and 192 is constructed as a transistor inverter including a pair of transistors for each phase as switching elements. The driving circuits 191 and 192 are controlled by the motor controller 260. When the transistors in the driving circuit 191 or in the driving circuit 192 are switched on in response to a control signal transmitted from the motor controller 260, the electric current runs between the HV battery 194 and the motor MG1 or the motor MG2. Each of the motors MG1 and MG2 may function as the motor that receives a supply of electric power from the HV battery 194 to be driven and rotated (hereinafter this state of operation is referred to as the power operation). While the rotor 132 or 142 is rotated by an external force, the motor MG1 or MG2 may function as the generator that causes an electromotive force to be generated between both ends of the three-phase coils 131 or 141 and charges the HV battery 194 (hereinafter this state of operation is referred to as the regenerative operation).

Figure 2:
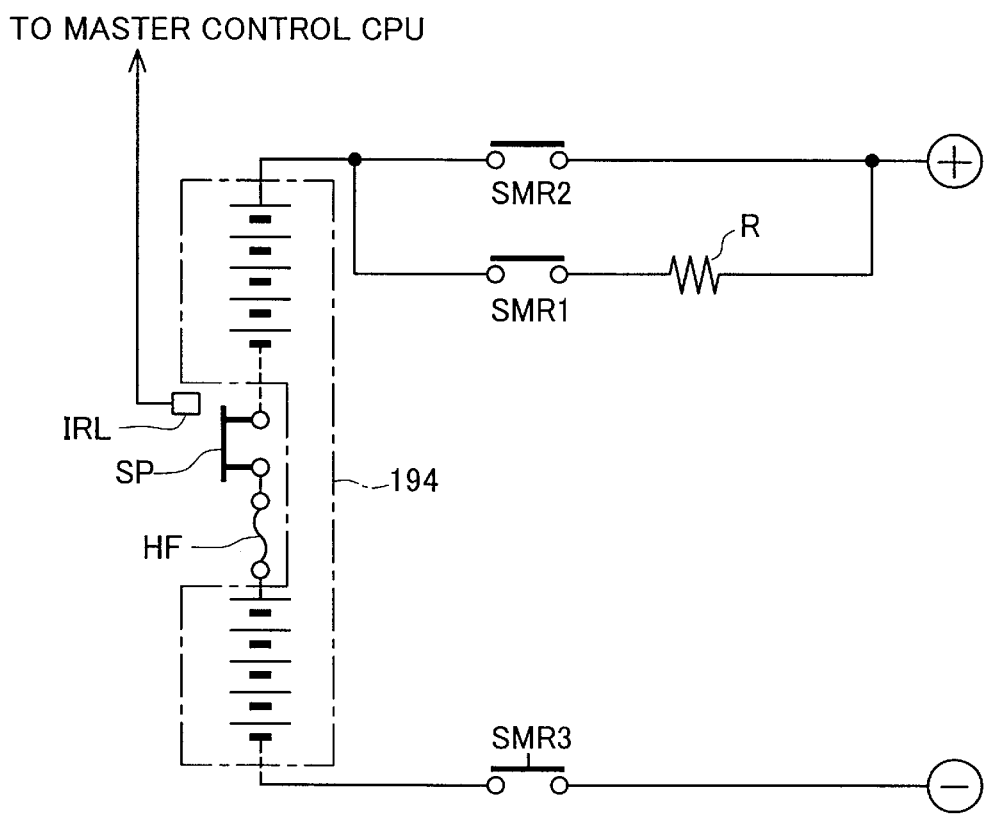
FIG. 2 shows connection of an HV battery with a service plug SP and system main relays SMR in the hybrid vehicle of the embodiment.

FIG. 2 shows the detailed structure of the HV battery 194. The HV battery 194 is provided with a total of three system main relays SMR1, SMR2, and SMR3 at plus and minus terminals to connect and cut off the power source of the high voltage circuit. The system main relays SMR1 through SMR3 are sequentially driven to open and close in response to an instruction transmitted from the master controller 270. At the time of connecting the high voltage power source, the procedure first sets the system main relays SMR1 and SMR3 ON and makes controlled current run through a resistor R, so as to protect the circuit from a high voltage rush current. The procedure subsequently sets the system main relay SMR2 ON and the system main relay SMR1 OFF. At the time of cutting off the high voltage power source, on the other hand, the procedure sequentially sets the system main relays SMR2 and SMR3 OFF. The master controller 270 confirms that the respective system main relays are OFF to cut off the power source.

A service plug SP and a high voltage fuse HF are connected in series in the middle of the HV battery 194, which includes a large number of power source modules. The service plug SP and the high voltage fuse HF are located in a rear part of the vehicle. Detachment of the service plug SP at the time of inspection and maintenance or at the time of any accident efficiently cuts off the high voltage in the middle of the HV battery 194, so as to assure the safety of working.

Figure 3:
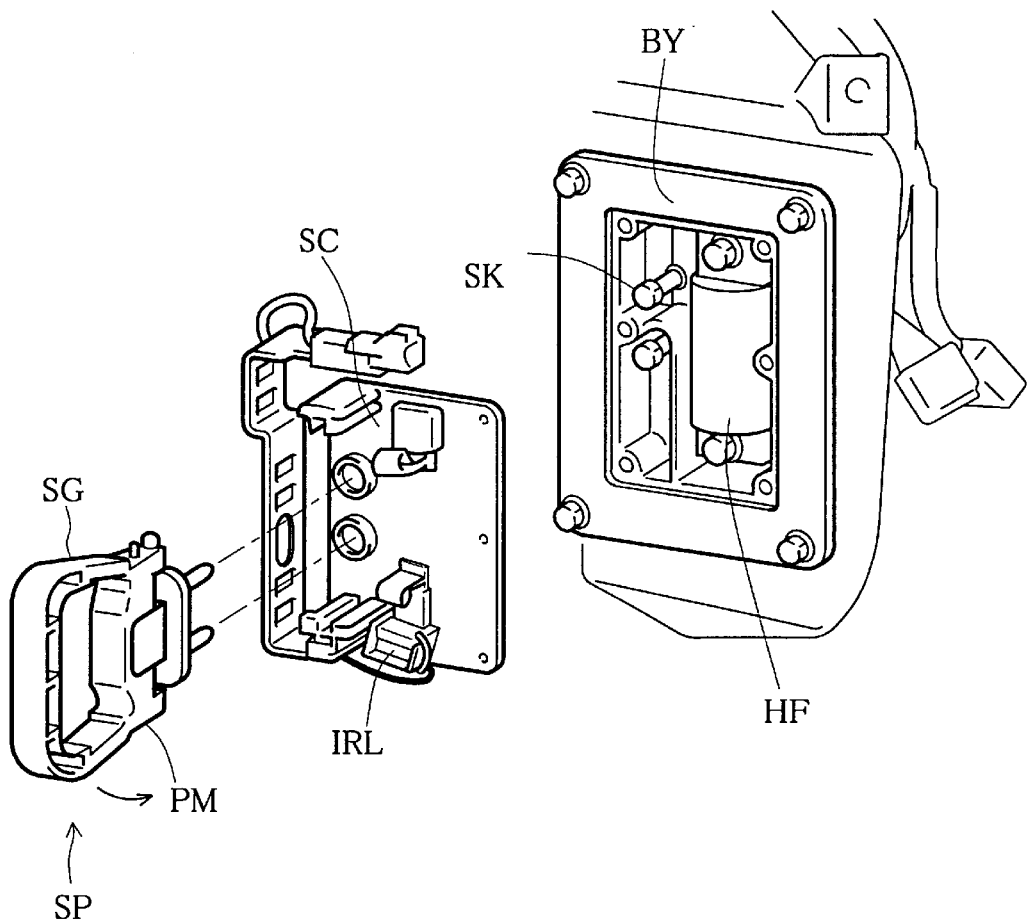
FIG. 3 illustrates the structure of the service plug SP.

FIG. 3 is a perspective view illustrating attachment of the service plug SP. The service plug SP is detachable only after a grip SG with a magnet PM embedded therein is pulled out. After the removal of the service plug SP, a service plug cover SC under the service plug SP may also be detached. The detachment of the service plug cover SC results in exposure of the high voltage fuse HF. While the grip SG is pulled out, mutual interaction between the magnet PM embedded in the grip SG and an interlock reed switch IRL disposed on the service plug cover SC sets the reed switch IRL OFF. The reed switch IRL is connected to the master controller 270. This connection enables the master controller 270 to detect the pull-out of the grip SG of the service plug SP. As discussed later, the master controller 270 sets the system main relays SMR1 to SMR3 OFF in response to detection of the OFF state of the reed switch IRL, so as to open the settings and cut off the power source of the high voltage circuit.

The HV battery 194 and the motors MG1 and MG2 are also connected to an auxiliary machinery battery 198 via a converter 252. This arrangement enables the high voltage electrical energy generated by the motors MG1 and MG2 or accumulated in the HV battery 194 to be converted into a low voltage of DC 12[V] and charges the auxiliary machinery battery 198 with the converted low voltage electrical energy.

The rotating shafts of the engine 150 and the motors MG1 and MG2 are mechanically linked with one another via a planetary gear 120. The planetary gear 120 includes a sun gear 121, a ring gear 122, and a planetary carrier 124 with a planetary pinion gear 123. In the hybrid vehicle of the embodiment, the crankshaft 156 of the engine 150 is coupled with a planetary carrier shaft 127 via a damper 130. The damper 130 is provided to absorb torsional vibrations arising on the crankshaft 156. The rotor 132 of the motor MG1 is linked with a sun gear shaft 125, whereas the rotor 142 of the motor MG2 is linked with a ring gear shaft 126. The rotation of the ring gear 122 is transmitted to an axle 112 and wheels 116R and 116L via a chain belt 129 and a differential gear 114.

The control system 200 utilizes a diversity of sensors to attain the control of the whole hybrid vehicle. Such sensors include an accelerator sensor 165 that measures the step-on amount or depression amount of an accelerator pedal by a driver, a gearshift position sensor 167 that detects the position of a gearshift lever, a brake sensor 163 that measures the step-on pressure of a brake pedal, a battery sensor 196 that measures the charge level of the HV battery 194, and a speed sensor 144 that measures the revolving speed of the motor MG2. The ring gear shaft 126 is mechanically linked with the axle 112 via the chain belt 129, so that the ratio of the revolving speeds of the ring gear shaft 126 to the axle 112 is fixed. The speed sensor 144 disposed on the ring gear shaft 126 accordingly detects the revolving speed of the axle 112 as well as the revolving speed of the motor MG2.

B. Basic Operations in Hybrid Vehicle

The description first regards the operations of the planetary gear 120 to explain the basic operations in the hybrid vehicle. In the planetary gear 120, when the revolving speeds of any two rotating shafts among the three rotating shafts mentioned above are specified, the revolving speed of the residual rotating shaft is automatically determined. The revolving speeds of the respective rotating shafts hold the relationship defined as Equation (1) given below:

$$Nc = Ns \times \rho/(1+\rho) + Nr \times 1/(1+\rho) \quad (1)$$

where Nc, Ns, and Nr respectively denote the revolving speed of the planetary carrier shaft 127, the revolving speed of the sun gear shaft 125, and the revolving speed of the ring gear shaft 126, and ρ represents a gear ratio of the sun gear 121 to the ring gear 122 as expressed by the following equation:

$$\rho = [\text{number of teeth of sun gear 121}]/[\text{number of teeth of ring gear 122}]$$

The torques of the three rotating shafts hold fixed relations defined as Equations (2) and (3) given below, irrespective of their revolving speeds:

$$Ts = Tc \times \rho/(1+\rho) \quad (2)$$

$$Tr = Tc \times 1/(1+\rho) = Ts/\rho \quad (3)$$

where Tc, Ts, and Tr respectively denote the torque of the planetary carrier shaft 127, the torque of the sun gear shaft 125, and the torque of the ring gear shaft 126.

The functions of the planetary gear 120 enable the hybrid vehicle of the embodiment to run in a variety of conditions. For example, in the state of a drive at a relatively low speed immediately after the start of the hybrid vehicle, the motor MG2 carries out the power operation to transmit the power to the axle 112 and drive the hybrid vehicle, while the engine 150 is at a stop or at an idle.

When the speed of the hybrid vehicle reaches a predetermined level, the control system 200 causes the motor MG1 to carry out the power operation and motors and starts the engine 150 with the torque output through the power operation of the motor MG1. At this moment, the reactive torque of the motor MG1 is output to the ring gear 122 via the planetary gear 120.

When the engine 150 is driven to rotate the planetary carrier shaft 127, the sun gear shaft 125 and the ring gear shaft 126 rotate under the conditions fulfilling Equations (1) through (3) given above. The power generated by the rotation of the ring gear shaft 126 is directly transmitted to the wheels 116R and 116L. The power generated by the rotation of the sun gear shaft 125 is, on the other hand, regenerated as electric power by the first motor MG1. The power operation of the second motor MG2 enables the power to be output to the wheels 116R and 116L via the ring gear shaft 126.

In the state of a stationary drive, the output of the engine 150 is set substantially equal to a required power of the axle 112 (that is, the revolving speed×torque of the axle 112). In this state, part of the output of the engine 150 is transmitted directly to the axle 112 via the ring gear shaft 126, while the residual power is regenerated as electric power by the first motor MG1. The second motor MG2 utilizes the regenerated electric power to produce a torque for rotating the ring gear shaft 126. The axle 112 is accordingly driven at a desired revolving speed and a desired torque.

When there is an insufficiency of the torque transmitted to the axle 112, the second motor MG2 supplements the insufficient torque. The electric power obtained by the regenerative operation of the first motor MG1 and the electric power accumulated in the HV battery 194 are used for such supplement. In this manner, the control system 200 controls the operations of the two motors MG1 and MG2 according to the required power to be output from the axle 112.

The hybrid vehicle of the embodiment may go back in the active state of the engine 150. While the engine 150 is driven, the planetary carrier shaft 127 rotates in the same direction as that in the case of the forward drive. In this state, when the first motor MG1 is controlled to rotate the sun gear shaft 125 at a higher revolving speed than the revolving speed of the planetary carrier shaft 127, the rotating direction of the ring gear shaft 126 is inverted to the direction for the rearward drive as clearly understood from Equation (1) given above. The control system 200 makes the second motor MG2 rotated in the direction for the rearward drive and regulates the output torque, thus enabling the hybrid vehicle to go back.

In the planetary gear 120, the planetary carrier 124 and the sun gear 121 may be rotated while the ring gear 122 is at a stop. The engine 150 is accordingly driven while the vehicle is at a stop. For example, when the HV battery 194 has a low charge level, the engine 150 is driven and causes the first motor MG1 to carry out the regenerative operation and charge the HV battery 194. The power operation of the first motor MG1 in the stationary state of the vehicle, on the other hand, motors and starts the engine 150 with the output torque.

C. Configuration of Control System in Embodiment

Figure 4:
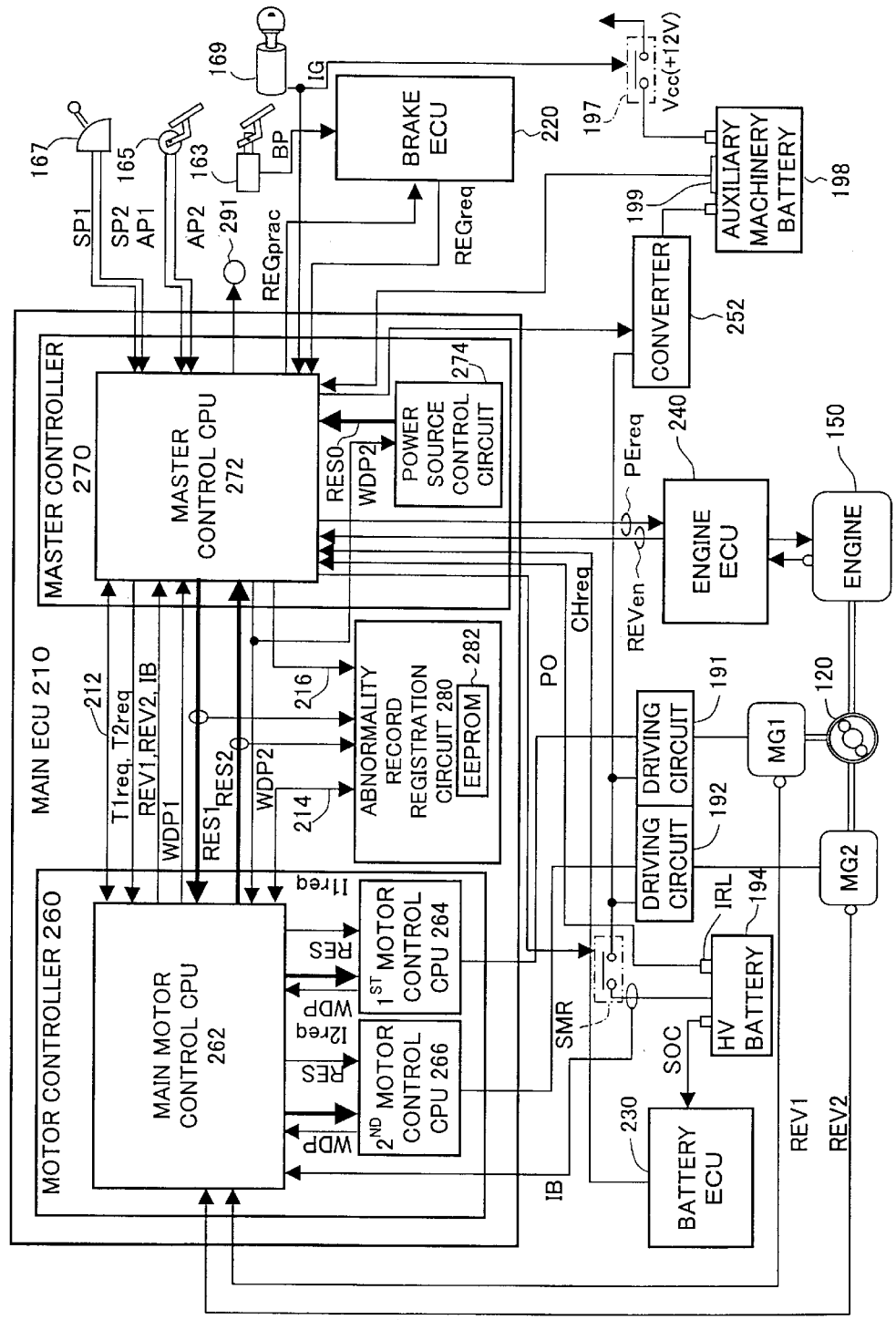
FIG. 4 is a block diagram showing the detailed configuration of a control system that controls the hybrid vehicle shown in FIG. 1.

FIG. 4 is a block diagram illustrating the detailed configuration of the control system 200 in this embodiment. The master controller 270 includes a master control CPU 272 and a power source control circuit 274. The motor controller 260 includes a main motor control CPU 262 and two motor control CPUs 264 and 266 that respectively control the two motors MG1 and MG2. Each of the CPUs is constructed as a one-chip microcomputer including a CPU, a ROM, a RAM, an input port, and an output port (not shown).

The master control CPU 272 functions to determine the control-relating quantities, for example, the distribution of the revolving speeds and the torques of the three prime movers 150, MG1, and MG2 and transmit a diversity of required values to the other CPUs and ECUs, so as to control the operations of the respective prime movers. In order to attain such control, accelerator position signals AP1 and AP2 representing the accelerator position or opening, gearshift position signals SP1 and SP2 representing the gearshift position, and the ignition signal IG that represents an ignition-related operation and is transmitted from the ignition sensor 169 are directly connected to an input port of the master control CPU 272. The master control CPU 272 also receives a brake signal BP transmitted from the brake sensor 163 via the brake ECU 220. Both the accelerator sensor 165 and the gearshift position sensor 167 have a dual structure, that is, include two sensor elements. The master control CPU 272 accordingly receives the two accelerator position signals AP1 and AP2 and the two gearshift position signals SP1 and SP2. The master control CPU 272 also controls on-off state of the system main relays SMR1, SMR2, and SMR3 to connect and cut off the high voltage power source from the HV battery 194 as discussed above. For the purpose of such on-off control, the master control CPU 272 monitors the state of the ignition sensor 169 that detects a turning motion of an ignition key and the state of the interlock reed switch IRL. Indicators and lamps provided on an inner panel are connected to an output port of the master control CPU 272. In the illustration of FIG. 4, only a diagnosis lamp 291 is shown as a typical example. The master control CPU 272 controls its output port to directly light these indicators and lamps.

As illustrated in FIG. 4, the master control CPU 272 is connected with the converter 252 that converts the high voltage direct current of the HV battery 194 into low voltage direct current and with a voltage sensor 199 that is mounted on the auxiliary machinery battery 198 to measure the voltage of the auxiliary machinery battery 198 and output a measurement signal VCE. The ignition sensor 169 outputs the starting requirement signal IG in response to a turning motion of the ignition key. The starting requirement signal IG switches the relay 197 on to allow supply of the low voltage power source Vcc. The master control CPU 272 receives the supply of the low voltage power source Vcc, switches on and off the system main relays SMR1 through SMR3 according to the voltage VCE of the auxiliary machinery battery 198, and controls the operations of the converter 252 when required. The power source control circuit 274 incorporated in the master controller 270 has the function of a monitoring circuit that monitors abnormality in the master control CPU 272.

The engine ECU 240 controls the engine 150 according to a required engine output PEreq given by the master control CPU 272. The engine ECU 240 feeds a revolving speed REVen of the engine 150 back to the master control CPU 272.

The main motor control CPU 262 transmits required electric currents I1req and I2req to the two motor control CPUs 264 and 266, based on required torques T1req and T2req of the two motors MG1 and MG2 given by the master control CPU 272. The motor control CPUs 264 and 266 respectively control the driving circuits 191 and 192 according to the required electric currents I1req and I2req, so as to drive the motors MG1 and MG2. The speed sensors of the motors MG1 and MG2 feed revolving speeds REV1 and REV2 of the motors MG1 and MG2 back to the main motor control CPU 262. The master control CPU 272 receives the revolving speeds REV1 and REV2 of the motors MG1 and MG2 as well as a value of electric current IB supplied from the HV battery 194 to the driving circuits 191 and 192, which are fed back from the main motor control CPU 262.

The battery ECU 230 monitors the state of charge or charge level SOC of the HV battery 194 and supplies a required value of charging CHreq of the HV battery 194, when required, to the master control CPU 272. The master control CPU 272 determines the output of each prime mover by taking into account the required value of charging CHreq. In the case of a requirement for charging, the master control CPU 272 causes the engine 150 to output a greater power than the value required for the drive and distributes part of the output power to the charging operation by means of the first motor MG1.

The brake ECU 220 carries out control to balance a hydraulic brake (not shown) with the regenerative brake by the second motor MG2. This is because the second motor MG2 carries out the regenerative operation to charge the HV battery 194 in the course of braking the hybrid vehicle of the embodiment. In accordance with a concrete procedure, the brake ECU 220 transmits a required regenerative power REGreq to the master control CPU 272, based on the brake pressure BP measured by the brake sensor 163. The master control CPU 272 specifies the operations of the motors MG1 and MG2 in response to the required regenerative power REGreq and feeds an actual regenerative power REGprac back to the brake ECU 220. The brake ECU 220 regulates the amount of braking by the hydraulic brake to an adequate value, based on the observed brake pressure BP and the difference between the required regenerative power REGreq and the actual regenerative power REGprac.

As described above, the master control CPU 272 determines the outputs of the respective prime movers 150, MG1, and MG2 and transmits the required values to the ECU 240 and the CPUs 264 and 266, which take in charge of the actual controls. The ECU 240 and the CPUs 264 and 266 control the respective prime movers in response to the required values. The hybrid vehicle is accordingly driven with the adequate power output from the axle 112 according to the driving state. In the course of braking, the brake ECU 220 cooperates with the master control CPU 272 to regulate the operations of the respective prime movers and the hydraulic brake. This arrangement attains the desirable braking operation that does not make the driver uneasy or uncomfortable, while allowing regeneration of electric power.

The two control CPUs 262 and 272 are connected to an abnormality record registration circuit 280 via bidirectional communication lines 214 and 216 to read and write data. There is another bidirectional communication line 212 interposed between the master control CPU 272 and the main motor control CPU 262 to transmit a variety of data including verification of the validity of the processing.

An input port of the abnormality record registration circuit 280 receives reset signals RES1 and RES2 transmitted between the master control CPU 272 and the main motor control CPU 262. The abnormality record registration circuit 280 registers the input reset signals RES1 and RES2 into an internal EEPROM 282. Namely the abnormality record registration circuit 280 has the function of monitoring generation of the reset signal and registering the generation record in response to a reset of the master control CPU 272 or the main motor control CPU 262.

D. Control at Starting Time

In the structure of the embodiment, the master control CPU 272 detects the OFF state of the interlock reed switch IRL and then controls off the system main relays SMR1 through SMR3, which function to connect and cut off the high voltage power source from the HV battery 194. When the grip SG of the service plug SP is pulled out to expose the high voltage fuse HF, the interlock reed switch IRL is set OFF. The basic processing keeps the system main relays SMR1 through SMR3 OFF even when a turning motion of the ignition key is detected. This effectively blocks the high voltage and assures the safety of working. The technique of the embodiment carries out another series of processing in addition to this basic processing, so as to make the assured safety compatible with the convenience of use.

Figure 5:
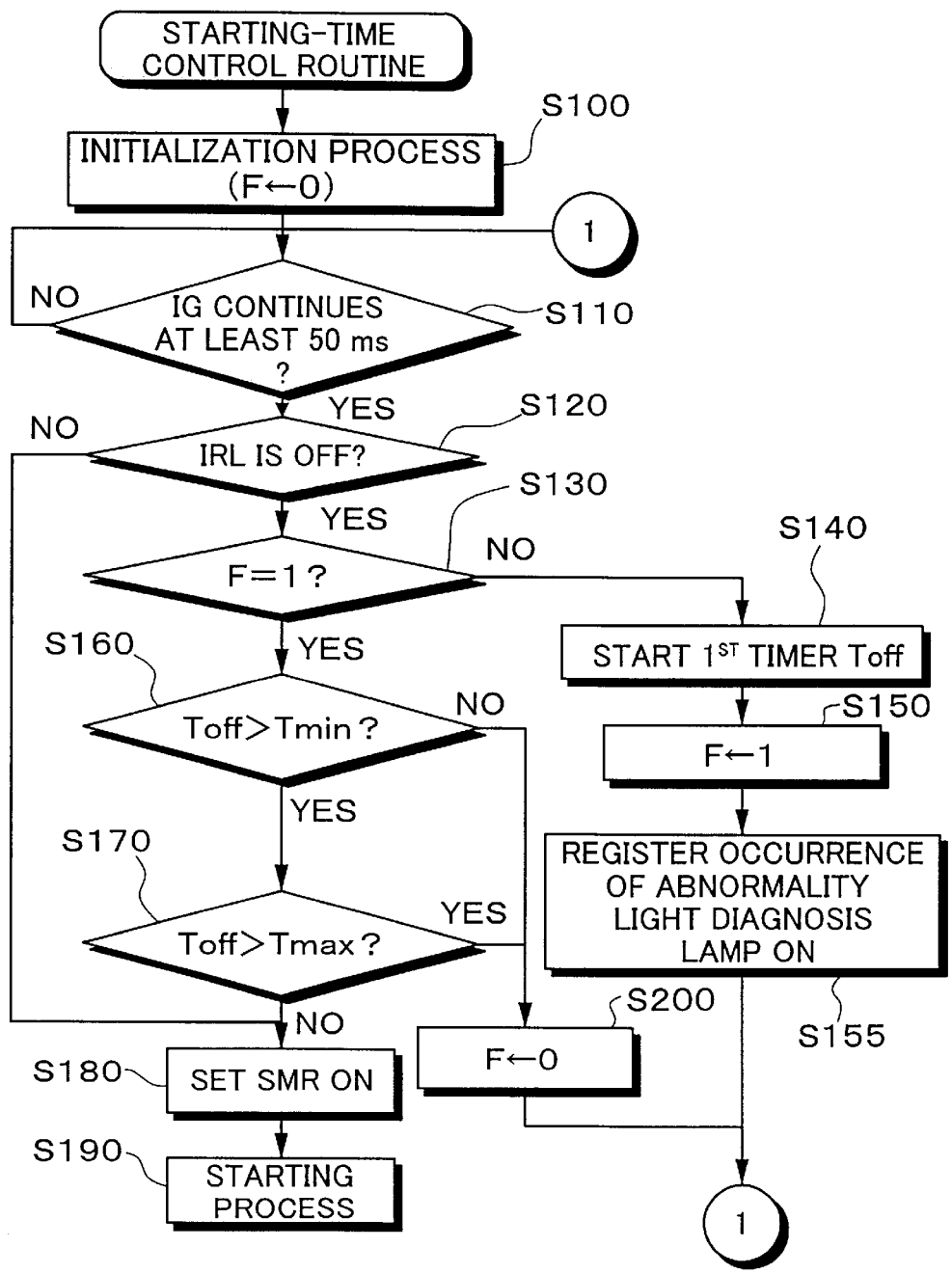
FIG. 5 is a flowchart showing a starting time control routine.

FIG. 5 is a flowchart showing a starting-time control routine executed by the master control CPU 272 in the embodiment. In response to a turning motion of the ignition key, the contact of the relay 197 interposed between the auxiliary machinery battery 198 and the power line for the respective ECUs is closed to activate the respective ECUs. The starting-time control routine shown in the flowchart of FIG. 5 is repeatedly executed by the master control CPU 272 when the ignition key is operated to allow the power supply.

The detection of the ignition sensor 169 is input into the master control CPU 272 as well as to the relay 197 disposed in the power line. Every time the ignition key is continuously operated for or over a preset time period Ton (50 milliseconds in this embodiment), the master control CPU 272 receives the information representing the continuous operation.

Immediately after the power supply to activate the vehicle, the master control CPU 272 first carries out an initialization process and sets initial values to respective variables at step S100. A flag F (discussed later) is also set equal to an initial value '0'. The master control CPU 272 then waits for an input of the signal IG that shows the ignition key is continuously operated for or over 50 milliseconds at step S110. In response to detection of the continuous operation of the ignition key for at least 50 milliseconds, the master control CPU 272 then reads a signal transmitted from the interlock reed switch IRL to determine whether or not the service plug SP is detached at step S120. The interlock reed switch IRL is set OFF when the grip SG of the service plug SP is pulled out, even if the service plug SP is not actually removed.

In the case where the interlock reed switch IRL is ON, the master control CPU 272 determines that the service plug SP is in its normal position, and sets the system main relays SMR1 through SMR3 ON at step S180. This causes the electric power of the HV battery 194, that is, the high voltage power source, to be connected to the power line of the high voltage equipment like the motor MG1 via the contacts thereof. The processing routine shown in the flowchart of FIG. 5 starts in response to detection of the continuous operation of the ignition key for at least 50 milliseconds by the ignition sensor 169, and goes on its flow upon the premise that the ignition sensor 169 continuously detects the starting requirement. At step S180 in the flowchart of FIG. 5, the master control CPU 272 sets ON the system main relays SMR1 through SMR3 on the assumption that there is still the starting requirement. In accordance with one modified procedure, it may be determined whether or not there is still the starting requirement, prior to the actual ON operations of the system main relays SMR1 through SMR3. In the presence of the starting requirement, the system main relays SMR1 through SMR3 are set ON at step S180. In the absence of the starting requirement, however, the program immediately exits from this routine.

The respective ECUs then start required starting operations at step S190. For example, the engine ECU 240 activate the engine 150, and the battery ECU 230 checks the state of charge SOC of the HV battery 194. The vehicle starts running in response to a subsequent depression of the accelerator pedal by the driver.

In the case of detection of the continuous operation of the ignition key for at least 50 milliseconds by the ignition sensor 169, when the service plug SP is removed, the interlock reed switch IRL is OFF to cut off the circuit of the HV battery 194 (see FIG. 2). In this state, the decision at step S120 gives an affirmative answer and does not start the starting control of the vehicle. The affirmative answer is given at the decision point S120 not only when the service plug SP is actually removed but when the grip SG is mistakenly pulled out of the service plug SP that is kept attached. The affirmative answer is also given in the case of erroneous operations due to failures on wiring, for example, the incomplete soldering at the terminal of the reed switch and the contact failure of the connector. In the first case, the vehicle can not start. In the other cases, however, since the high voltage circuit itself can form a closed circuit, start of the vehicle is electrically allowable as long as the safety is assured. The series of processing at and after step S130 accordingly allows the starting control of the vehicle in specific conditions. This series of processing corresponds to evaluation of the driver's action.

When it is determined at step S120 that the interlock reed switch IRL is OFF, the master control CPU 272 determines whether or not the flag F is set equal to 1 at step S130. Since the flag F is set equal to 0 at the initialization process of step S100, the decision at step S130 generally gives a negative answer and the program proceeds to step S140 to start a first timer Toff. The flag F identifies the number of times of the operation of the ignition key, that is, either the first time or the second time.

After starting the first timer Toff, the master control CPU 272 identifies the first operation of the ignition key and sets the value '1' to the flag F at step S150. The master control CPU 272 subsequently registers the occurrence of abnormality into the abnormality record registration circuit 280 and lights the diagnosis lamp 291 on at step S155. The program then returns to step S110 and repeats the above series of processing.

After the ignition key has once been operated for at least 50 milliseconds and the above series of processing has been performed, the master control CPU 272 waits for detection of another operation of the ignition key for at least 50 milliseconds at step S110. As discussed above, in response to detection of another operation of the ignition key for or over 50 milliseconds, the master control CPU 272 determines whether or not the interlock reed switch IRL is OFF at step S120. When the interlock reed switch IRL is kept OFF, the master control CPU 272 subsequently determines whether or not the flag F is equal to 1 at step S130. In the case of the re-operation of the ignition key, since the value '1' has been set to the flag F at step S150, the decision at step S130 gives an affirmative answer. The master control CPU 272 then compares the time on the first timer Toff with a preset minimum off time Tmin at step S160 and successively with a preset maximum off time Tmax at step S170.

Figure 6:
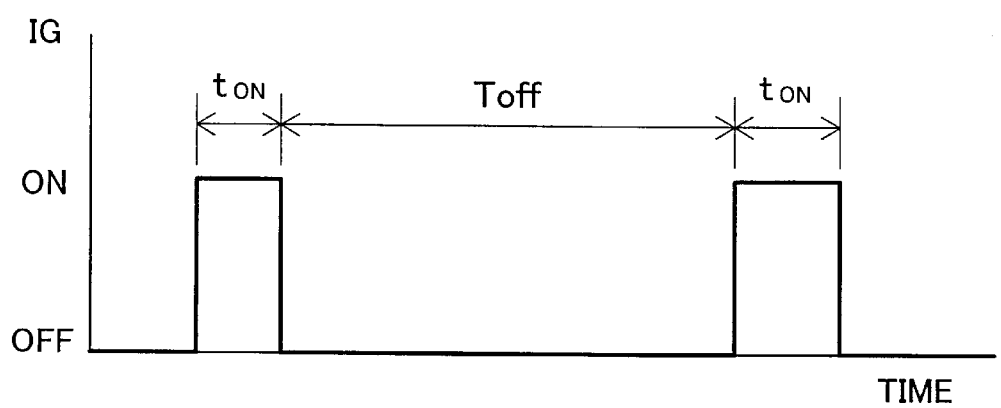
FIG. 6 shows an operation signal IG of an ignition key.

Based on the results of the comparison between the time on the first timer Toff and the preset minimum off time Tmin and the preset maximum off time Tmax, the master control CPU 272 carries out the determination and the processing as discussed below in the case where the signal IG, which corresponds to the operation of the ignition key and is transmitted from the ignitions sensor 169, is input twice as shown in FIG. 6.

(1) In the case where the time on the first timer Toff is less than the preset minimum off time Tmin (5 seconds in this embodiment), the master control CPU 272 determines that the ignition key chatters or is repeatedly turned on and off within a very short time period. The program thus proceeds to step S200 to reset the flag F to the value '0'. The program then returns to step S110 and repeats the above series of processing. When the ignition key chatters or is repeatedly turned on and off within an extremely short time period, the master control CPU 272 determines that the driver does not intend to start the vehicle in a normal manner. The system main relays SMR1 through SMR3 accordingly do not form the closed circuit. This does not apply the high voltage of the HV battery 194 to the high voltage power line and assures the safety of the mechanics. The vehicle does not naturally start but is at a stop.

(2) In the case where the time on the first timer Toff is greater than the preset minimum off time Tmin (5 seconds in this embodiment) and is further greater than the preset maximum off time Tmax (1 hour in this embodiment), the master control CPU 272 determines that the second operation of the ignition key is not related to the first operation of the ignition key. As in the case of (1) discussed above, the program proceeds to step S200 to reset the flag F to the value '0'. The program then returns to step S110 and repeats the above series of processing. When the second operation of the ignition key is after elapse of an extremely long time since the first operation, the master control CPU 272 determines that the driver does not intend to start the vehicle in a normal manner. The system main relays SMR1 through SMR3 accordingly do not form the closed circuit. This does not apply the high voltage of the HV battery 194 to the high voltage power line and assures the safety of the mechanics. The vehicle does not naturally start but is at a stop.

(3) In the case where the time on the first timer Toff is greater than the preset minimum off time Tmin (5 seconds in this embodiment) but is less than the preset maximum off time Tmax (1 hour in this embodiment), the master control CPU 272 determines that the driver intends to start the vehicle in a normal manner. The program thus proceeds to step S180 to set the system main relays SMR1 through SMR3 ON and to step S190 to start the vehicle. In the case where the ignition key is operated normally twice at a time interval of several seconds, even if the interlock reed switch IRL is in the off state, the procedure tries to start the vehicle since there is a possibility that the grip SG of the service plug SP is mistakenly pulled out. Namely the result of the detection of the interlock reed switch IRL is evaluated according to the driver's action (two operations of the ignition key within a preset time period). When the sufficient safety is assured, it is determined that removal of the service plug SP is not expected, based on the result of the detection of the reed switch IRL. When the service plug SP is actually taken out under such conditions, even the on state of the system main relays SMR1 through SMR3 does not allow the high voltage of the HV battery 194 to be applied to the high voltage power line. Only when the grip SG of the service plug SP is mistakenly pulled out and when the driver operates the ignition key twice within the preset time period, the high voltage of the HV battery 194 is applied to the high voltage power line. This arrangement enables the vehicle to start according to the driver's requirement, while assuring the safety of the mechanics.

In any case, when the ignition key is turned on in the off state of the interlock reed switch IRL, the master control CPU 272 detects such an operation of the ignition key as the occurrence of abnormality, registers the occurrence of abnormality in the abnormality record registration circuit 280, and light the diagnosis lamp 291 on at step S155. This informs the driver of the occurrence of some abnormality in the vehicle to be checked even when the vehicle starts driving. At a garage, a service station, or any other equivalent spot, the driver and the mechanic can read detailed data regarding the occurrence of abnormality (for example, the conditions and the causes of the abnormality) from the abnormality record registration circuit 280.

As described above, the hybrid vehicle of the embodiment adopts the interlock system that controls off the system main relays SMR1 through SMR3 in response to the pull-out action of the grip SG of the service plug SP for the inspection and the maintenance of the high voltage power source. This interlock system ensures the sufficient safety of working. When the driver's operation of the ignition key suggest s a subtle erroneous operation or detection, the arrangement of the embodiment temporarily cancels the function of the interlock system. This recovers the basic functions of the hybrid vehicle while estimating the safety in the starting process.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

For example, one modified arrangement registers the past event of starting the vehicle in the off state of the interlock reed switch IRL and changes the processing flow in response to detection of another operation of the ignition key to start the vehicle. For the enhanced safety, the procedure adopted in this arrangement may permit the start of the vehicle under such conditions only several times. For the enhanced convenience, the procedure adopted in this arrangement may require the driver's two consecutive operations of the ignition key and carry out the above series of processing at the first time of detection, but may cancel the function of the interlock system in response to only one operation of the ignition key at the subsequent times of detection. For the further improvement in estimation accuracy of safe driving, the detection signals of the ignition sensor 169 and the elapse of time may be used for the estimation in combination with the results of detection of plural other sensors, such as the gearshift position sensor 167 and the brake sensor 163. In one example, the results of detection of the ignition sensor 169 maybe combined with the results of detection of a driver's seating state detection sensor that is used to check the state of the seat belt. In this case, a permission to start the vehicle is given only when the driver is seated on the driver's seat and wears a seat belt. Another modified arrangement provides a second timer Tres, independently of the first timer Toff, to measure the time period Ton in which the ignition key is continuously operated to start the vehicle. When the observed time period Ton exceeds a preset time period Tref, the procedure determines that the current operation of the ignition key is not the normal starting operation.

The scope and spirit of the present invention are indicated by the appended claims, rather than by the foregoing description.

What is claimed is:

1. A vehicle with a high voltage power source mounted thereon, said vehicle comprising:

a relay having a contact interposed between said high voltage power source and a power line of said vehicle;

a relay actuation requirement unit that outputs a requirement signal to close the contact of said relay;

a cutoff member that is handled in a manual manner to cut off output of said high voltage power source on a side closer to said power source than said relay;

an operation detection unit that detects an operation including a specific operation to handle said cutoff member;

a prohibition unit that prohibits the contact of said relay from being closed in response to detection of the operation;

a driving action detection unit that detects a driver's driving action;

an evaluation unit that evaluates a result of the detection of said operation detection unit, based on a result of the detection by said driving action detection unit; and a cancellation unit that, when said evaluation unit specifies that the evaluated result of the detection of said operation detection unit is an operation other than the specific operation to handle said cutoff member, cancels the function of said prohibition unit, which prohibits the contact of said relay from being closed, but actuates said relay in response to the requirement signal output from said relay actuation requirement signal.

2. A vehicle in accordance with claim 1, wherein said driving action detection unit comprises a sensor that is provided in said vehicle to detect an instruction to drive said vehicle.

3. A vehicle in accordance with claim 2, wherein said evaluation unit specifies that the evaluated result of the detection of said operation detection unit is an operation other than the specific operation to handle said cutoff member, when the instruction to drive said vehicle is detected at least twice within a preset first time period.

4. A vehicle in accordance with claim 3, wherein said evaluation unit comprises an initialization unit that initializes a condition of the evaluation when a second preset time period has elapsed since a first detection of the instruction to drive said vehicle.

5. A vehicle in accordance with claim 1, said vehicle further comprising an information unit that, when the operation including the specific operation to handle said cutoff member is detected, informs the driver of the detection.

6. A vehicle in accordance with claim 1, said vehicle further comprising an information unit that, when the operation including the specific operation to handle said cutoff member is detected and there is a requirement to close the contact of said relay, informs the driver of the detection.

* * * * *